United States Patent [19]

Takada

[11] 4,411,449
[45] Oct. 25, 1983

[54] CONNECTING MEMBER FOR A DRIVE WIRE CASING IN PASSIVE SEAT BELT SYSTEMS

[76] Inventor: Juichiro Takada, 3-12-1, Shinmachi, Setagayaku, Tokyo, Japan

[21] Appl. No.: 272,358

[22] Filed: Jun. 10, 1981

[30] Foreign Application Priority Data

Jun. 13, 1980 [JP] Japan .............................. 55-081831[U]

[51] Int. Cl.³ .............................................. B60R 21/10
[52] U.S. Cl. ...................................... 280/804; 403/11; 403/312; 464/170
[58] Field of Search ..................... 280/804; 403/11, 13, 403/14, 312, 326, 329, 330, 302, 385 US, 386 US; 464/170, 171

[56] References Cited

U.S. PATENT DOCUMENTS

| | | | |
|---|---|---|---|
| 2,538,043 | 1/1951 | Roy et al. ............................ | 403/312 |
| 3,411,813 | 11/1968 | Kreuz .................................... | 403/13 |
| 4,062,636 | 12/1977 | Jardin et al. ........................... | 403/13 |

*Primary Examiner*—Robert R. Song
*Assistant Examiner*—Dennis Pedder
*Attorney, Agent, or Firm*—Brumbaugh, Graves, Donohue & Raymond

[57] ABSTRACT

A passive vehicle safety belt system having a belt transfer member that is moved between restraining and releasing configurations along a guide rail by a drive device that includes a racked wire comprising a connector for joining the casing for the drive wire to the guide rail having two parts defining an elongated retaining portion that are joined to clamp the casing within a longitudinally disposed socket. A plurality of closely spaced, annular grooves help in holding the casing in the socket. The halves clamp the sleeve in the bore. A clasp portion is joined to the retaining portion and is disposed in the guide rail. Resilient ears are received in holes in the guide rail to lock the retaining portion to the guide rail.

8 Claims, 4 Drawing Figures

CONNECTING MEMBER FOR A DRIVE WIRE CASING IN PASSIVE SEAT BELT SYSTEMS

FIELD OF THE INVENTION

The present invention relates to a passive type vehicle occupant restraint belt system, that is, the type of occupant restraint belt system in which a lap belt, shoulder belt or both are automatically transferred between restraint and release configurations in response to opening and closing of the vehicle door.

BACKGROUND OF THE INVENTION

It is widely recognized by vehicle safety authorities that the manually operated restraint belt systems with which most motor vehicles are equipped at the present time are often not used by the vehicle occupants. Many people find in unduly troublesome to do up the belt each time they enter the vehicle and undo it when they leave. They also find the belt somewhat uncomfortable when in the restraining position. By the same token, it is also recognized that the safety belts can markedly reduce injuries and fatalities resulting from vehicle accidents.

In order to encourage the use of a safety belt system, a great deal of development effort has gone into the creation of passive type belt systems that are automatically shifted into a restraining configuration when an occupant enters a vehicle and closes the door and automatically transferred to a releasing configuration when the occupant opens the door. Many of these proposed passive systems employ one or more belt guide members that are connected to the restraint belt and are driven back and forth along a guide rail to transfer tne engaged portion of the belt between a restraint location and a release location establishing the respective restraining and release configurations of the belt. For example, some types of systems involve a shoulder belt that is connected to a moving anchor that moves along a track located at the edge of the vehicle roof generally above the door. The moving anchor moves between a restraint location above and behind the outboard shoulder of the occupant and a release location at or along the front pillar. In a similar system, the outboard end of a shoulder belt is anchored above and behind the vehicle occupant and passes from the anchor through a movable guide member that moves along a track above the door. Other systems employ a moving anchor or a belt guide member that moves along a guide rail installed on the vehicle door, and there are some systems in which an inboard portion of a lap belt, shoulder belt, or control belt is moved forward and backward.

The drive mechanism for transferring the moving anchor or transfer member or movable belt guide, which are hereinafter referred to collectively as a belt guide member, often is a reversible, electric motor powered by the vehicle battery and coupled to the belt guide member by a semiflexible drive element, such as a racked wire, by means of a reduction device. The drive wire runs within an outer casing which must be connected to the guide rail in the passive seat belt system.

In the prior art, there are two ways for connecting the outer casing of the racked wire to the guide rail. In one case the outer casing is inserted in an unassembled twopiece connecting member, the two pieces of which are thereafter joined together to form a single unit which is then inserted in the guide rail. In the other case, the connecting member is mounted on the guide rail, and then the outer casing and the racked wire are connected to the connecting member.

Both ways for locking the outer casing to the guide rails suffer from significant difficulties. The guide rail and outer casing must be assembled, and then the belts must be attached to the belt guide before the system can be installed in a vehicle. After attaching the guide rain and associated restraining belts to the vehicle, the belt drive mechanism must be installed in the vehicle. These arrangements pose significant difficulties when implemented on an assembly line.

A portion of the guide member must project from the guide rail so that a restraining belt can be attached. Usually, the belt is sewn to the projecting portion of the guide member after the guide member has been installed in the vehicle. Since the guide member is generally located along the roof of the vehicle, it is difficult to sew the belt to the projecting portion in the cramped area. The sewing process proceeds very slowly, too, and bottlenecks in the assembly line can develop.

The prior art ways of attaching the racked wire to the sliding guide member also pose significant problems when repairs must be made or when the belts are changed. The small working area and cramped space require difficult manipulations to dismount the guide rail and its associated components. The large amounts of time involved in disassembling and reassembling the mounting systems also increase the cost of replacing a belt or repairing a broken seat belt restraining system.

SUMMARY OF THE INVENTION

There is provided, in accordance with the present invention, a belt guide member transfer system which meets very well all the requirements described above, namely, ease of installation and dissassembly during repair, along with relatively low manufacturing and installation costs. It will be apparent to those skilled in the art that the system can be applied to a moveable belt guide associated with any of a variety of types of passive belt systems.

In accordance with one aspect of the present invention, a connecting member is used to clamp an outer casing of a racked wire or the like to a guide rail in a passive seat belt system. The connecting member has projecting, flexible ears which fit into apertures formed in the guide rail. The ears can be depressed to remove the connecting member, and thereby, the racked wire, when repairs are to be effected to the passive seat belt system.

The connecting member of the present invention has first and second parts constituting an elongated retaining portion. A longitudinally disposed bore includes a plurality of closely spaced annular grooves. The halves of the retaining portion clamp the outer casing of the racked wire in the bore. A clasp portion, which is joined to the retaining portion, is provided to lock the retaining portion to the guide rail. The retaining portion may comprise a tongue formed on one half of the retaining portion and mating with a grove in the other half. In one embodiment, the tongue and groove have a curved configuration to clamp the halves together.

A pair of mating lugs can be provided on the upper and lower edges of the parts of the retaining portion to help clamp the halves together. A screw and a nut may be disposed through holes formed in the lugs further to clamp the halves together.

BRIEF DESCRIPTION OF THE DRAWINGS

For a more complete understanding of the present invention and its advantages, reference is made to the following Detailed Description taken in conjunction with the drawings, wherein.

DETAILED DESCRIPTION

Figure 1:
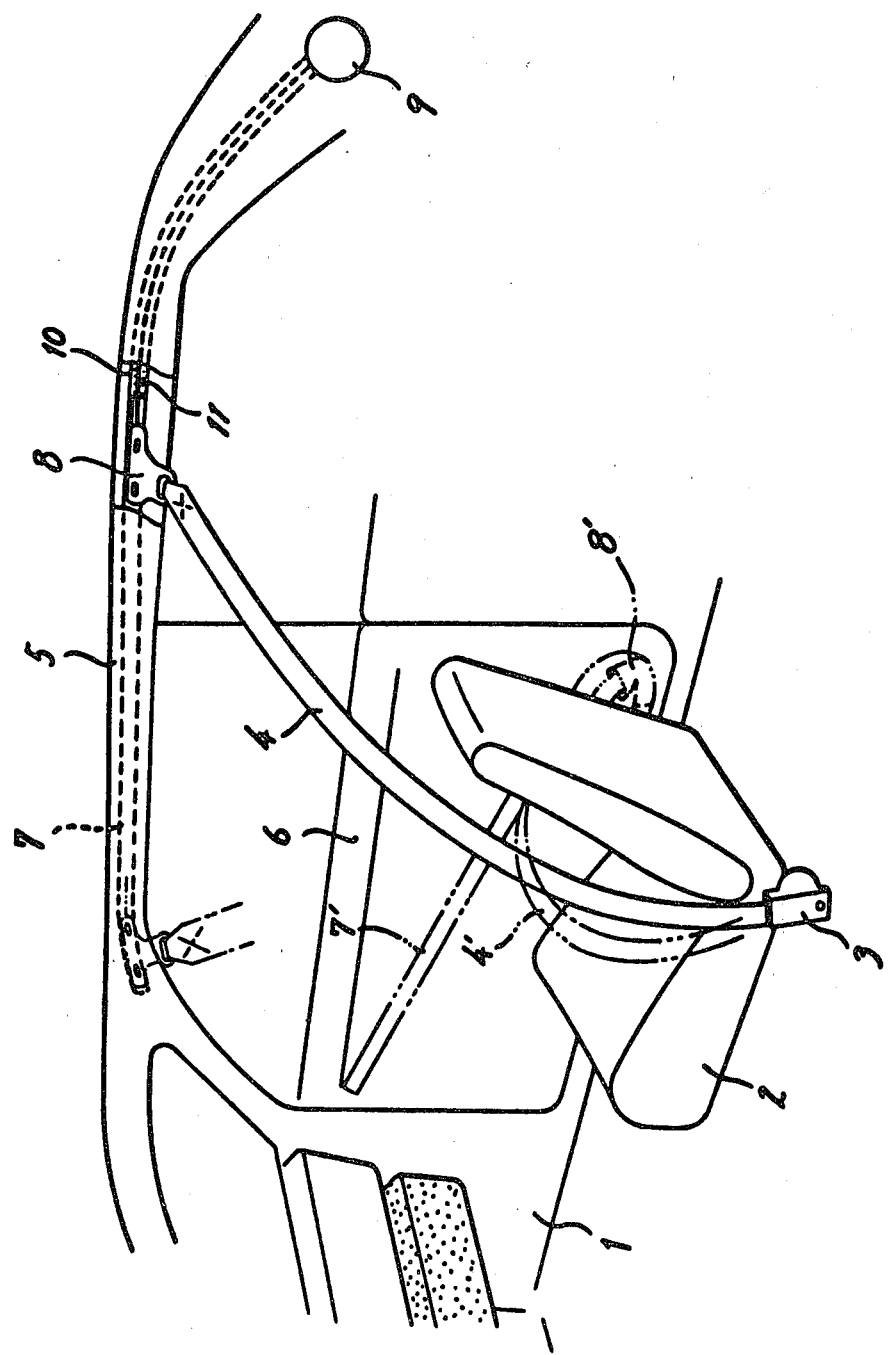
FIG. 1 is a partially schematic, cut-away view of a passive seat belt system with which the embodiments of the present invention may be used.

As shown in FIG. 1, a vehicle, such as an automobile, includes a seat 2 in which an occupant is to be restrained. A seat belt retractor 3 is positioned adjacent the rear of the lower inboard side of the seat 2. A shoulder belt 4 extends from the retractor 3 upwardly and outwardly to a guide member 8 that slides along a guide rail 7 located along the inner roof edge 5 of the vehicle 1. In so-called three-point systems a control belt leads from the retractor, and both a shoulder belt 4 and a lap belt 4' are provided, in which case the lap belt 4' is connected to a sliding guide member 8' positioned in a guide rail 7' located on the inside of door 6.

The belt guide member 8 is moved fore and aft along the guide rail 7 by a drive system that comprises a racked wire 11 and a drive device 9 installed in the vehicle 1. When the vehicle door is opened, the drive system moves the belt guide member 8 to a release location at the upper forward end of the guide rail 7, and in the process, shifts the shoulder belt 4 into a release configuration in which it lies generally close to the inner surface of the door 6. In the three-point system the lap belt 4' is transferred by the guide member 8', which moves forward along the guide rail 7' to a release location at the upper forward end of the guide rail 7'. When the vehicle door is closed, the belt guide member 8, 8' move to a restraining location at the rearward end of the guide rails 7, 7'.

Figure 2:
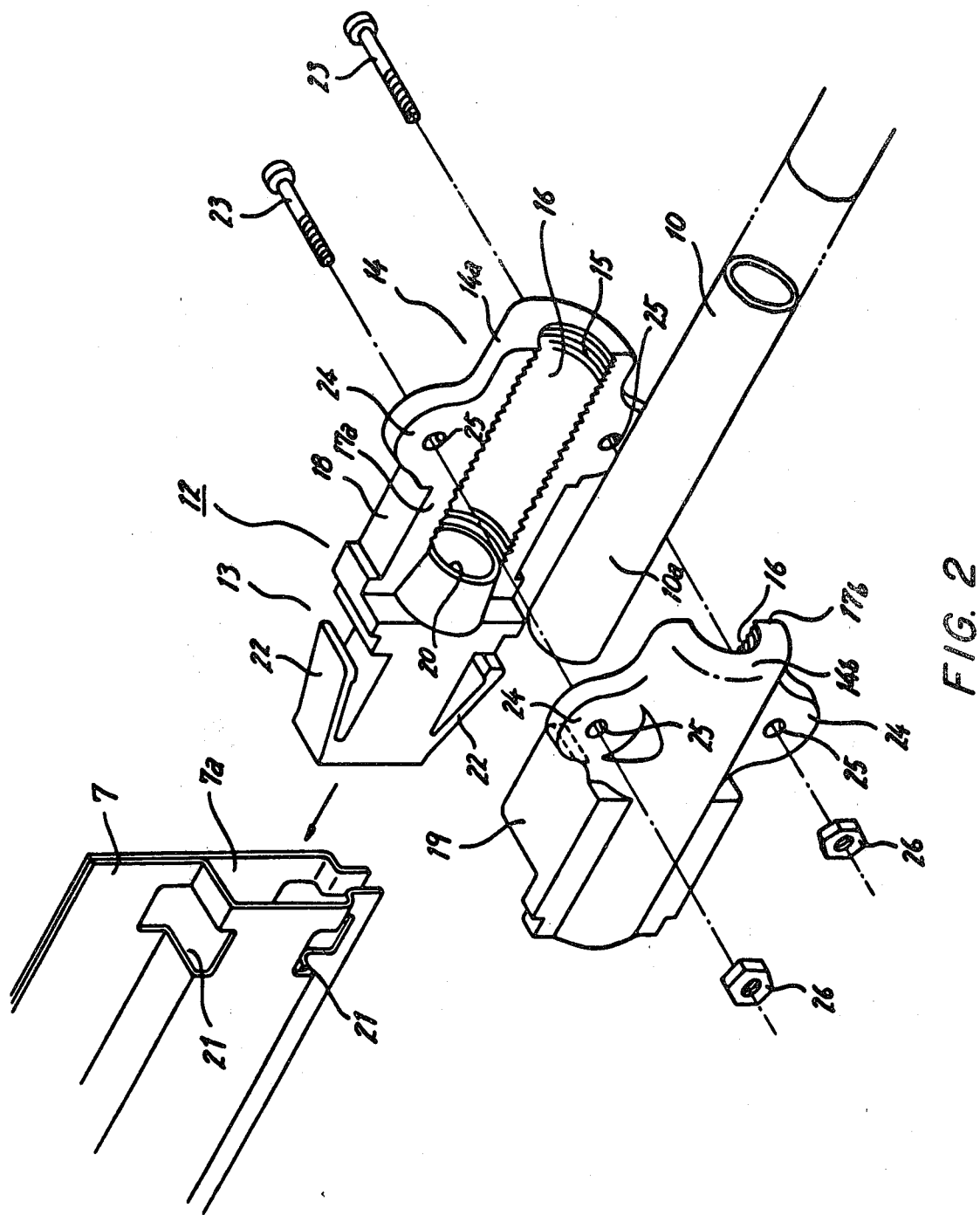
FIG. 2 is an exploded perspective view of one embodiment of a connecting member of the present invention.

The guide rail 7 includes holes 21 (see FIG. 2) formed in the upstanding portion. The upstanding portion of the guide rail 7 forms a hollow cavity 7a, which receives the connecting member 12 of the present invention that includes a clasp portion 13 and a retaining portion 14. The retaining portion 14 includes a first half 14a and a second half 14b. A plurality of annular grooves 15 are formed in a longitudinally extending socket or bore 16. The outer casing 10 of the racked wire 11 is positioned in the bore 16 with the annular grooves 15 serving to clamp the casing 10 therein. Flat faces 17a, 17b are provided on the halves 14a, 14b to provide a snug fit between the halves 14a, 14b when they are positioned to clamp the casing 10 in the bore 16. An aperture or hole 20 is formed in the half 14a through which the racked wire 11 (not shown) passes to connect with the sliding guide member 8.

Each half 14a, 14b includes projecting ears or flanges 24 and aligning holes 25. Screws 23 are inserted through the holes 25 in the ears 24 to fasten the halves 14a, 14b together with nuts 26.

One half, 14b, includes a tongue 19 which mates with a groove 18 formed on the other half 14a. The tongue 19 and groove 18 are designed to help clamp the halves 14a, 14b together and thereby the outer casing 10 in the longitudinally disposed bore 16.

One half, 14a, joins the clasp portion 13 that has upstanding, finger-like ears 22. The ears 22 are relatively thin, but extend across the thickness of the clasp portion 13. In the illustrated embodiment, the ears 22 project at an acute angle with respect to the body of the clasp portion 13. The ears 22 are shaped so that the clasp portion 13 can be inserted in the hollow portion 7a of the guide rail 7. The ears 22 project through the apertures 21 in the guide rail 7 so that the halves 14a, 14b cannot be withdrawn from the guide rail 7. Of course, the projecting ears 22 can be depressed to release the connecting member 12.

Figure 3:
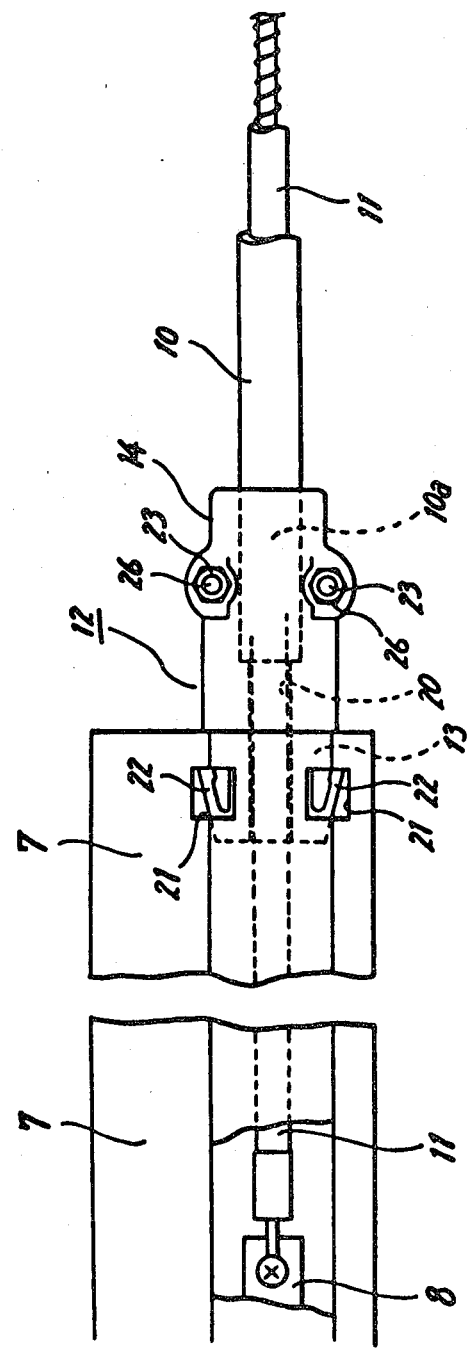
FIG. 3 is a side view of an embodiment of a connecting member of the present invention connecting a racked wire with a guide rail of a passive restraining system, with the phantom lines indicating the portions of the connecting member and the racked wire.

As shown in FIG. 3, the connecting member 12 has been connected to a guide rail 7 of a passive restraining seat belt system. The outer casing 10 of the racked wire 11 has been inserted in the longitudinally disposed bore 16 defined by retaining portion 14. The screws 23 and nuts 26 have been inserted in the ears 24 to clamp the halves 14a, 14b together. The clasp portion 13 is inserted in the guide rail 7, and the ears 22 project through the apertures 21 in the guide rail 7. According to a preferred embodiment, a portion 10a (FIG. 2) of the outer casing 10 is covered with a suitable glue to help secure the outer casing 10 in the connecting member 12. The racked wire 11 extends through the bore 20 and the connecting member 12 and is connected to the sliding guide member 8 disposed in the rail 7.

Figure 4:
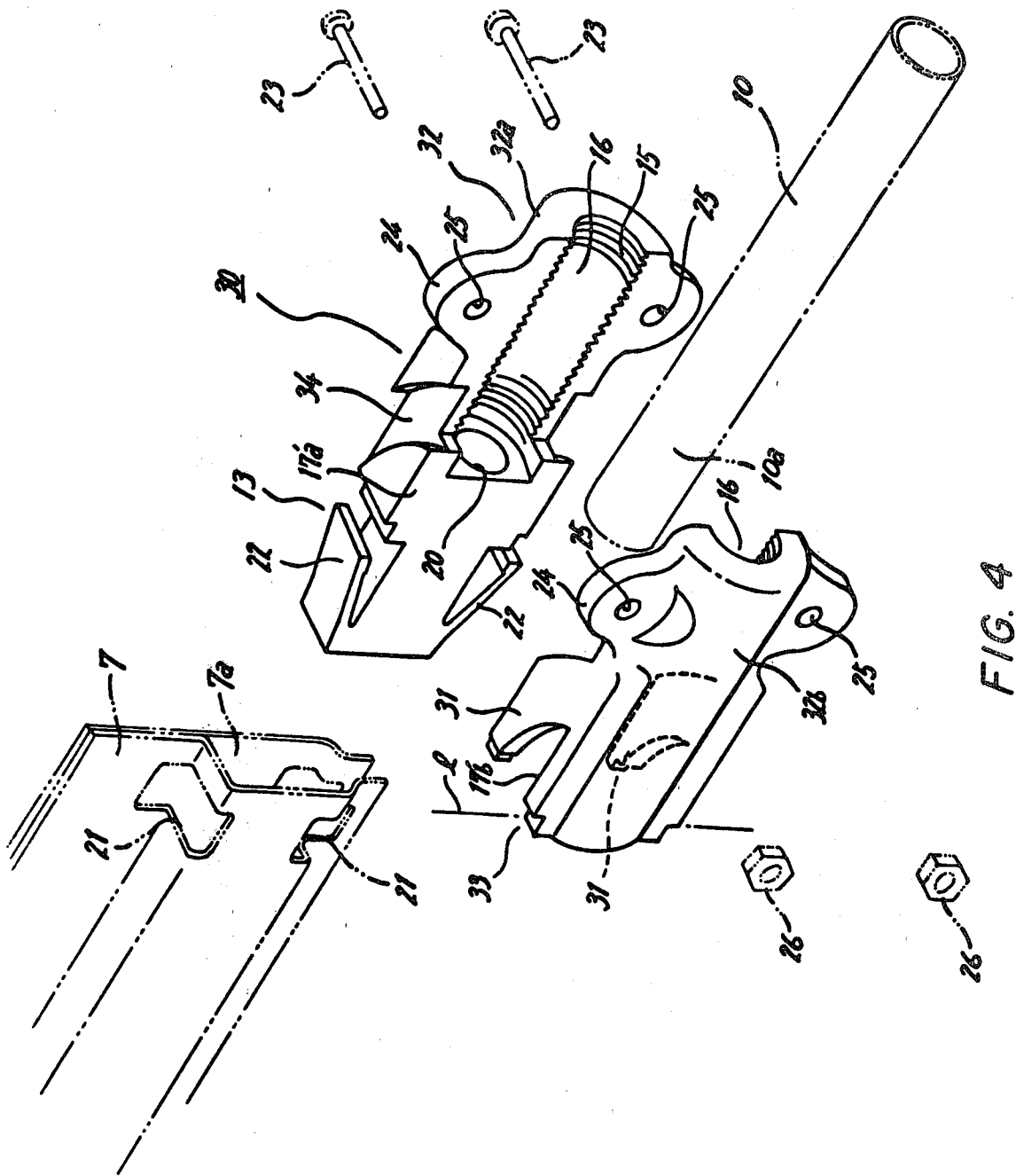
FIG. 4 is an exploded, perspective view of an alternate embodiment of a connecting member.

As shown in FIG. 4, another embodiment of a connecting member 30 comprises a clasp portion 13 and a retaining portion 32, which includes first and second halves 32a, 32b. The elements of the connecting member 30 of FIG. 4 corresponding with the elements of the connecting member 12 in FIG. 2 carry the same reference numerals. In the embodiment of FIG. 4, the tongue 31 projecting from the half 32b engages the groove 34 formed in the other half 32a. The tongue 31 and groove 34 have a curved configuration whereby clamping forces are exerted between the halves 32a, 32b to help clamp the outer casing 10 in the longitudinally disposed bore 16.

To install the system, a suitable glue is applied to the end portion 10a of the outer casing 10 and the portion 10a is placed in one half of the bore 16. The halves 14a, 14b and 32a, 32b of the connecting members 12 and 30 are clamped together using the projecting tongues 19 and 31 and grooves 18 and 34, respectively. Screws 23 are inserted through the holes 25 in the projecting ears 24, and the nuts 26 are screwed thereon. The annular grooves 15 help hold the outer casing 10 within the bore 16. The racked wire 11 is inserted through the outer casing 10, the aperture 20, and into the space 7a of the guide rail 7. It is a simple matter to insert the clasp portion 13 of the connecting member 12 or 30 into the hollow space 7a, with the projecting ears 22 engaging the corresponding apertures 21 in the guide rail 7.

While more than one embodiment of the present invention has been described herein, various further modifications may be made without departing from the spirit and scope of the invention.

We claim:

1. In a passive vehicle safety belt system having a transfer member that is moved between restraining and releasing configurations along a guide rail by a drive device that includes a drive wire with an outer casing, a connecting member for joining the guide rail to the outer casing of the drive wire comprising:

first and second parts constituting an elongated retaining portion defining portions of a longitudinally disposed socket having a plurality of closely spaced annular grooves, the parts clamping the outer casing of the drive wire in the socket; and a clasp portion joined to the retaining portion, disposed in the guide rail, with locking means mating with apertures in the guide rail for releasably locking the retaining portion to the guide rail.

2. The apparatus of claim 1 and further comprising a tongue projecting from one part of the retaining portion and mating with a groove in the other part for holding the parts together.

3. The apparatus of claim 2 wherein the tonque and groove have a curved configuration adapted to hold the parts of the retaining portion together.

4. The apparatus of claim 2 and further comprising mating lugs projecting from each part and connecting means clamping the lugs together.

5. The apparatus of claim 4 wherein the connecting means comprises a screw and a nut.

6. The apparatus of claim 2 wherein the clasp portion is joined to only one of the parts of the retaining portion.

7. The apparatus of claim 1 wherein the locking means comprises a pair of resilient projecting ears received in the apertures in the guide rail to lock the clasp portion to the guide rail.

8. The apparatus of claim 7 wherein the projecting ears comprise elongated fingers projecting at an acute angle from the clasp portion.

* * * * *